No. 851,568. PATENTED APR. 23, 1907.
H. H. SUTRO & L. M. BOOTH.
APPARATUS FOR DISTRIBUTING OR DIVIDING LIQUIDS.
APPLICATION FILED JUNE 28, 1905.
3 SHEETS—SHEET 3.
Fig: 3
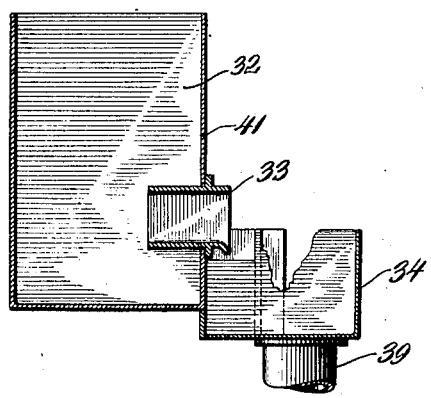
Fig: 4
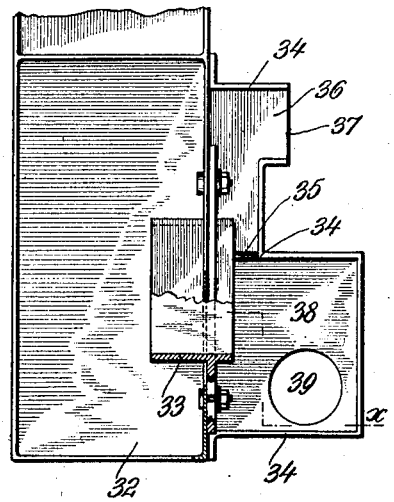
Fig: 5
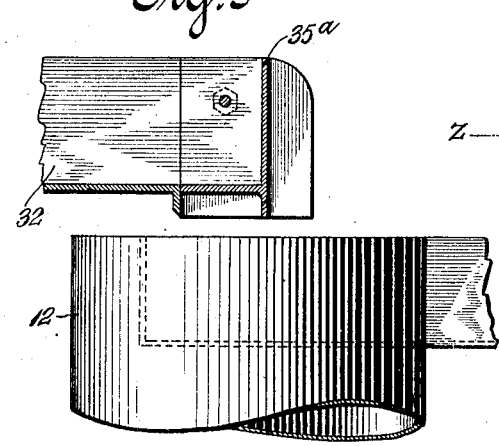
Fig: 6
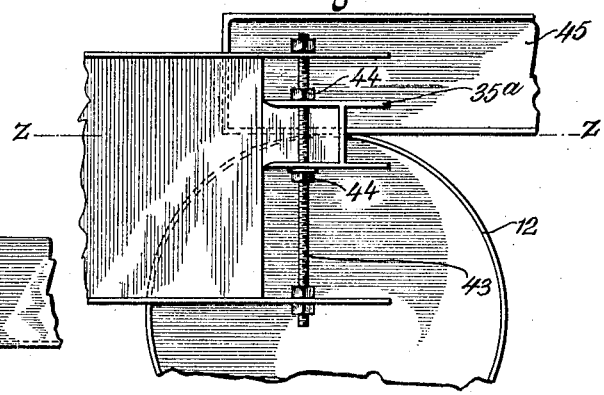
Fig: 7
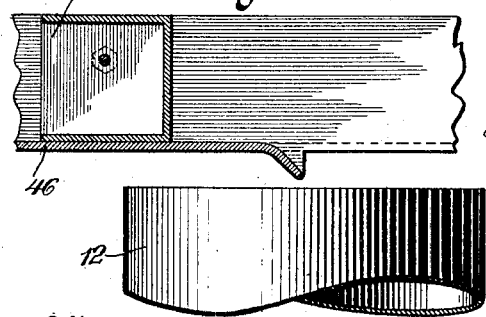
Fig: 8
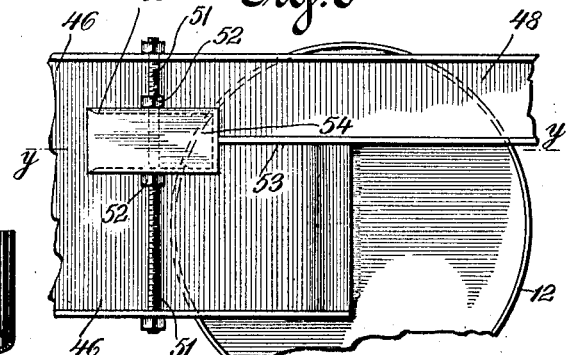
Witnesses
Egbert N. Nelson
E. Lumin.
Inventors
Harry Herbert Sutro
Lewis Miller Booth
By their Attorney
Henry M. Brigham

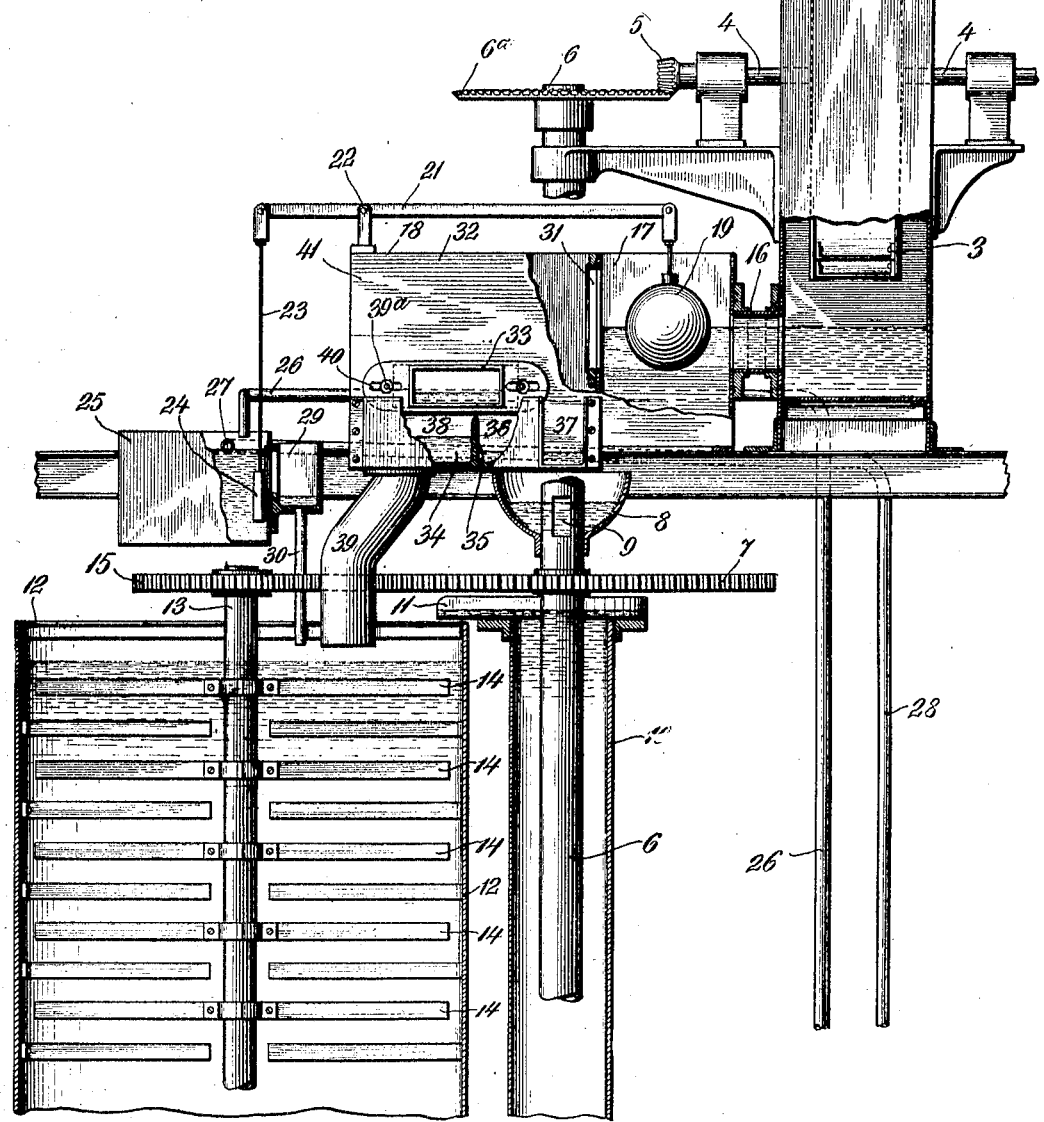

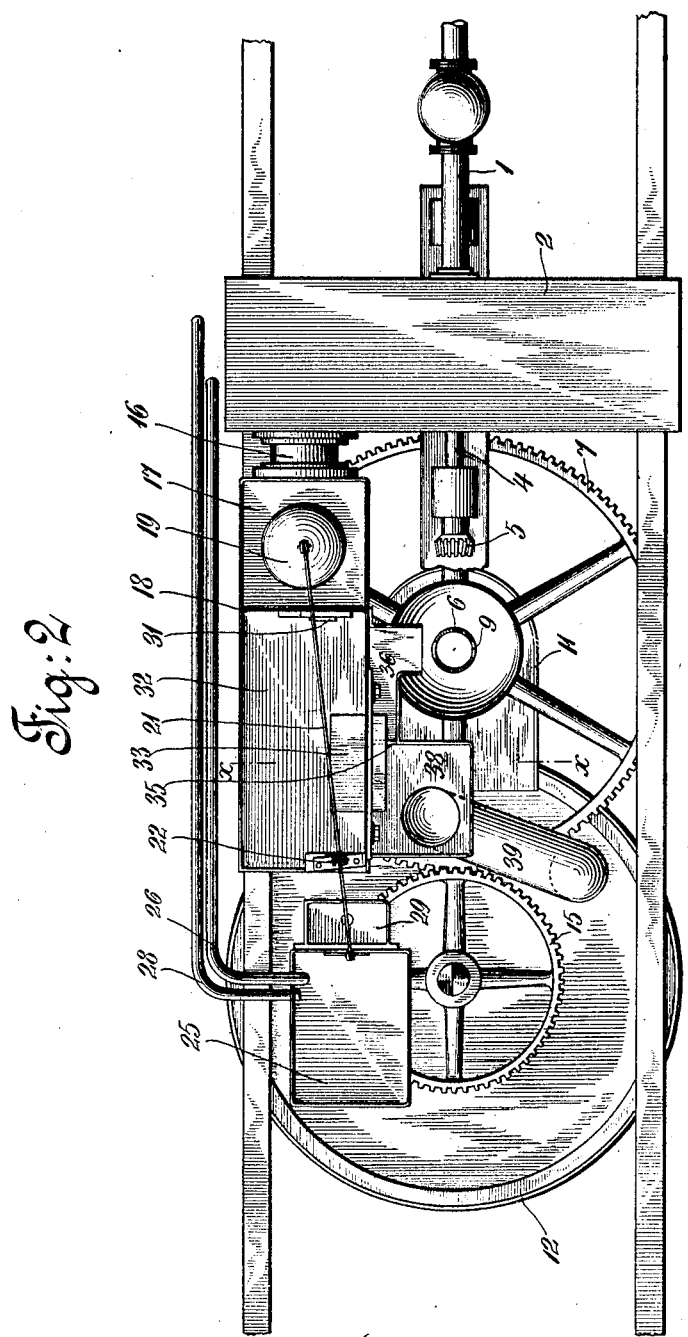

UNITED STATES PATENT OFFICE.

HARRY HERBERT SUTRO, OF NEW YORK, N. Y., AND LEVIS MILLER BOOTH, OF PLAINFIELD, NEW JERSEY.

APPARATUS FOR DISTRIBUTING OR DIVIDING LIQUIDS.

No. 851,568.

Specification of Letters Patent.

Patented April 23, 1907.

Application filed June 28, 1905. Serial No. 267,384.

*To all whom it may concern:*

Be it known that we, HARRY HERBERT SUTRO, of the borough of Manhattan, in the city, county, and State of New York, and LEVIS MILLER BOOTH, of Plainfield, in the county of Union and State of New Jersey, (and whose post-office addresses are No. 126 Liberty street, in the said borough of Manhattan, New York city, New York,) have invented certain new and useful Improvements in Apparatus for Distributing or Dividing Liquids, of which the following is a specification.

The object of our invention is to provide a simple and effective apparatus for distributing or dividing liquids into parts which shall bear predetermined relative proportions to each other, and to provide means for varying such relative proportions and is especially adapted for use in connection with apparatus for purifying water and other liquids; the particular features of our invention are pointed out in the appended claims.

In the accompanying drawings Figure 1 is a side view partly in section of our invention; Fig. 2 is a plan view of the same partly in section; Fig. 3 is a side view partly in section on the line XX of a portion of our apparatus. Fig. 4 is a plan view partly in section of the same portion of our apparatus; Fig. 5 is an elevation partly in section of a modification of the apparatus for dividing the liquid into separate streams; Fig. 6 is a plan view of the modification shown in Fig. 5; Fig. 7 is an elevation partly in section of another modification of our apparatus for dividing the liquid into two separate streams and Fig. 8 is a plan view of the modification shown in Fig. 7.

We have not shown the lime-water tank and settling tank of the apparatus and only the upper portion of the reaction tank, for the reason that these are of the well known type shown in our previous application filed June 28, 1904, and numbered 214,441, for improvements in water softening and purifying apparatus.

1, is the supply pipe by which raw water is fed to the wheel box 2; 3 is the water wheel contained in the wheel box; 4 is the wheel shaft and mounted on the end thereof is the bevel gear 5; 6 is a hollow shaft carrying gear wheels 6ª and 7, and a funnel 8 and having intake openings 9 within the funnel which is mounted near the upper end thereof. The hollow shaft 6 leads to the lime-water tank not shown. 10 is a pipe or sleeve surrounding the pipe 6 with an annular space between the two. The lower end of 10 opens into the top of the lime water tank not shown. 10 is provided at its upper end with a spout 11 which discharges into the reaction tank 12.

13 is a shaft mounted in the reaction tank having blades or stirrers 14 mounted upon it and the gear wheel 15 which is driven by the gear wheel 7. The raw water which is discharged from the pipe 1 into the wheel box 2 flows over the wheel causing the same to rotate and communicate its motion through the shaft 4 and the gear wheels 5 and 6ª to the shaft 6 and through the gear wheels 7 and 15 to the shaft 13. The water then falls to the bottom of the box 2 and overflows through the pipe 16 into the float compartment 17 of the box 18.

19 is a float mounted upon a rod 20, which is pivotally attached at its upper end to one end of the lever 21, which is pivoted upon a fulcrum 22. To the other end of the lever 21 is pivoted a rod 23, which is attached to the feed gate 24 which regulates the discharge of solution from the auxiliary chemical solution tank 25, which is fed by a supply pipe 26. The liquid in this auxiliary tank is maintained at a constant level by means of the overflow opening 27, which discharges into the pipe 28. The solution which is discharged from the auxiliary tank 25 over the discharge gate 24 passes into the box 29 and down through the pipe 30 into the reaction tank where it is mingled with the raw water. The water which flows into the float compartment 17 passes through the gate 31 into the compartment 32, from which it flows in a broad stream through the chute 33 into the distributing box 34. The apron of water flowing from the chute 33 is divided into two portions of predetermined relative volume by means of the dividing partition 35, which is mounted in the distributing box 34. One portion flows through the compartment 36 and the outlet 37 into the funnel 8 and through the openings 9 and the pipe 6 into the lime water tank, the other portion flows into the compartment 38 and through the pipe 39 into the reaction tank. The discharge chute 33 is mounted upon the side of the compartment 32 by means of studs 39ª, which screw into the side walls of the compartment 32; these studs pass through slots 40, which permit of a lateral adjustment of the chute in such a way that a greater or lesser proportion of the water discharged through the chute may be delivered to the compartments 36 and 38 respectively. This adjustment is rendered necessary as different waters contain greater or lesser quantities of impurities which render it necessary to feed different proportionate quantities of lime water to the water to be purified. As the water which passes into the compartment 36 is returned to the reaction tank 12 as saturated lime water and the water to be treated is discharged from the compartment 38 through the pipe 39 into the reaction tank, the proportion of lime water to raw water which is delivered to the reaction tank can be and is determined by the adjustment of the chute 33 and this adjustment can be easily varied to suit the water which is to be purified.

In Figs. 5 and 6 we have shown a modification of our distributing apparatus; the wall 41 of the compartment 32 being removed, the compartment 32 becomes essentially a trough and the water in passing from it is divided into two separate streams by the dividing member 35$^a$, which is mounted upon the rod 43 and is adjustable laterally and can be secured in any desired position by means of the nuts 44. Fig. 5 is partly in cross section on the line ZZ of Fig. 6; the chute 45 is designed to discharge into the funnel 8 and the balance of the water that passes through 32 is discharged directly into the reaction tank. The dividing member 35$^a$ is provided with a floor, two side walls and a lower end wall, and the floor abuts against the end of the trough making a water tight connection. This construction renders it possible to adjust the dividing member laterally with reference to the side walls of the trough and discharge all the liquid passing on the one side of the dividing member into the chute 45 and all the liquid passing on the other side of said dividing member into the tank 12. By this construction also the proportion of liquid discharged on each side of the dividing member bears substantially a fixed relation to the distances of the dividing member from the respective walls of the trough and no currents or eddies are generated which will substantially disturb the operation of the apparatus.

Figs. 7 and 8 show another modification of our distributing device. Fig. 7 being partly in cross section on line YY of Fig. 8. 46 is the compartment into which the water is discharged from 17 and is essentially a trough. The water flowing through the trough 46 is divided into two parts by the dividing member 35$^b$ one portion flowing down through the trough 48 into 8 and the other through the trough 49 directly into the reaction tank 12. The dividing member 35$^b$ is laterally adjustable by means of the rod 51 and the nuts 52, and abuts against the stationary wall 53 and its floor lies on the floor of the trough. As the dividing member 35$^b$ is moved laterally in either direction the relative volume of water which is fed to the respective troughs 48 and 49 is varied. The wall 54 of the dividing member 35$^b$ abuts against the partition wall 53 and as a consequence all the water which passes on either side of the dividing member is retained in its respective trough and flows to its intended destination.

We have shown our apparatus as it is used by us in connection with apparatus for purifying water. It is apparent however that our invention may be effectively used in connection with apparatus for the division or distribution of liquids and without reference to apparatus for the purification of water.

Having described our apparatus what we claim as new and desire to secure by Letters Patent is:

1. In apparatus for purifying water a laterally adjustable chute adapted to discharge water in the form of an apron into a distributing box provided with a partition adapted to divide the apron of water into two parts and means for conducting each of such parts to different parts of the apparatus, substantially as and for the purposes described.

2. In a water purifying apparatus, the combination with a distributing box, provided with a partition adapted to divide the liquid into parts, of a chute, and means for adjusting said chute with relation to said distributing box.

Signed at the city of New York, State and county of New York, on the 1st day of May 1905.

HARRY HERBERT SUTRO.
LEVIS MILLER BOOTH.

Witnesses:
E. QUINN,
WILLARD N. BAYLIS.